UNITED STATES PATENT OFFICE.

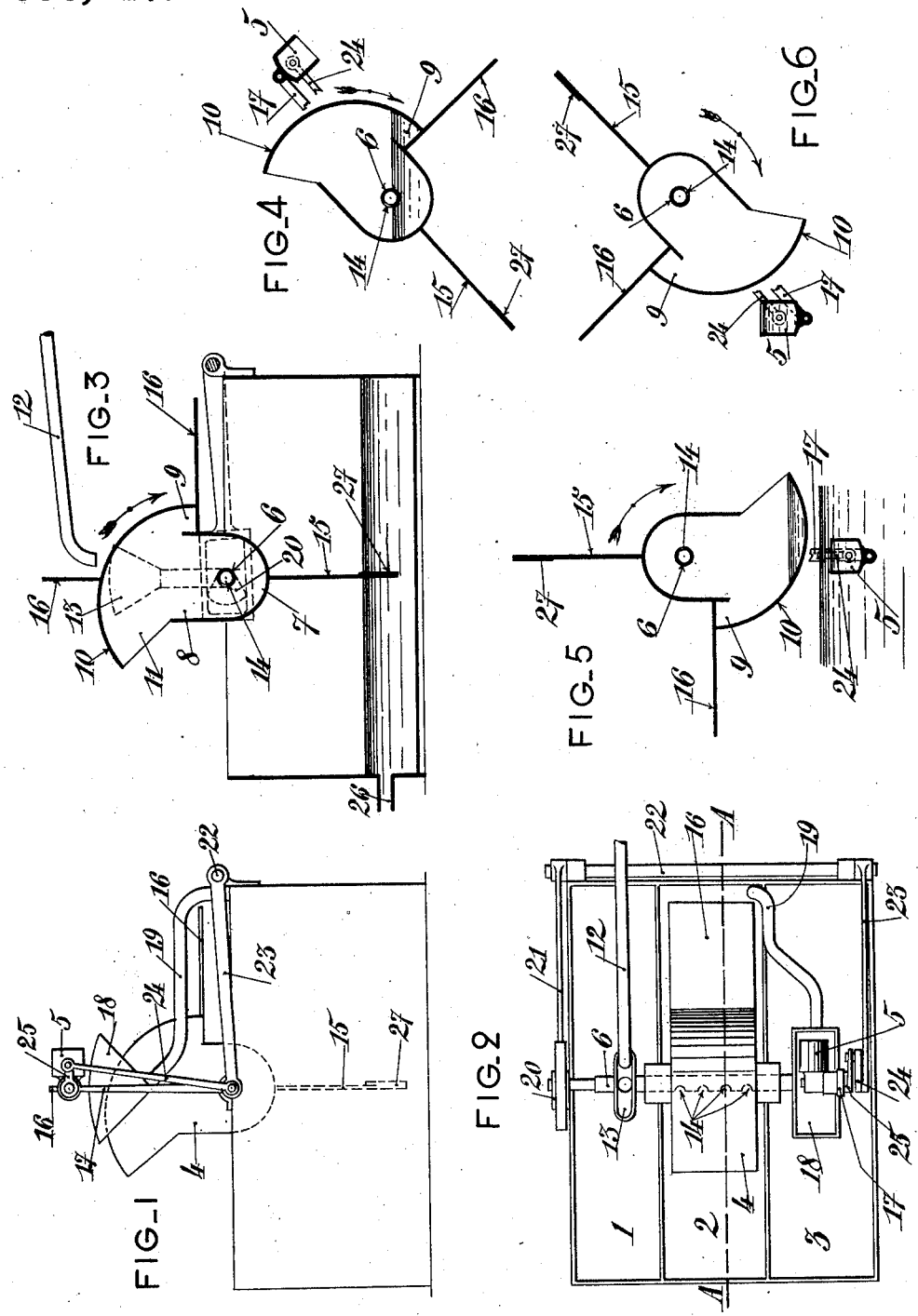

ALBERT WINCKLER AND CHARLES WINCKLER, OF LYON, FRANCE.

WATER-PURIFYING APPARATUS.

998,317.   Specification of Letters Patent.   Patented July 18, 1911.

Application filed March 21, 1911. Serial No. 615,937.

*To all whom it may concern:*

Be it known that we, ALBERT WINCKLER and CHARLES WINCKLER, citizens of the French Republic, residing at Lyon, in France, have invented a certain new and useful Improvement in Water - Purifying Apparatus, of which the following is a specification.

This invention relates to water purifying apparatus more particularly applicable to the purification of water for industrial purposes by means of chemicals.

The apparatus automatically adds a definite quantity of reagent to a definite quantity of water to be purified.

The annexed drawing illustrates an example of construction of the invention.

Figure 1 is an elevation. Fig. 2 is a plan view. Fig. 3 is a section on line A—A of Fig. 2. Figs. 4, 5, 6 illustrate successive positions of the rotary water measuring vessel.

The apparatus comprises a rotary vessel which delivers at each revolution a definite quantity of water to be purified while a calibrated cup delivers to this quantity of water a regular quantity of reagent prepared in advance in the liquid state.

The rotary water measuring vessel 4 and the cup 5 are mounted on a horizontal axle rotating over a tank divided into three compartments 1, 2, 3. The vessel 4 rotates in the central compartment 2; it is formed as shown in Fig. 3 of a semi-cylindrical chamber 7 concentric with the axle and having an extension in the form of a rectangular chamber 8 of which one of the side walls $8^a$ is lower than the other, the top edge $8^b$ of which acts as an overflow sill for the liquid and over which the liquid flows into the lateral chamber 9. The whole is closed at its upper part by a curved plate 10 at the extremity of which is a space 11 for the outlet of the water.

The vessel 4 is ballasted by a paddle 15 carrying a weight 27 so calculated that while the said vessel is empty it takes the position indicated in Fig. 3.

The water to be purified is introduced by the conduit 12 and flows into a funnel 13 fixed to and communicating with the interior of the hollow axle 6. The hollow axle communicates with the interior of the vessel 4 by means of lateral apertures 14. The water flowing through these apertures 14 will fill the vessel 4 without destroying its equilibrium but this equilibrium will be sharply destroyed by the flow of the water from the chamber 8 over $8^b$ into the chamber 9 which causes the vessel to turn in the direction of the arrow.

For the purposes of illustration successive positions of the rotation are shown in Figs. 4, 5, and 6. During this movement the water flows out over the curved plate 10 and produces the rotation of the apparatus, until it is completely empty as shown in Fig. 6. It returns by simple gravity to its original position (Fig. 3) and again commences to refill, the same cycle being continued. These movements are accomplished without shock by the simple displacement of the center of gravity; the movement of rotation is also retarded by the paddle 15 and by further paddles 16 by the resistance to their rotation produced by the water contained in the compartment 2 in which they revolve. While the vessel 4 is rotating the funnel 13 which turns with it does not collect the water delivered by the conduit 12 which is diverted into the compartment 1 and is led away. The compartment 2 only receives the measured quantity of water to which is added the desired amount of reagent as will be hereinafter described.

If it is necessary to save the crude water introduced by the conduit 12, this conduit can be provided with a cock or other suitable closing device which will cut off the water when the vessel 4 starts moving and open again directly said vessel reaches its position of rest.

The reagent prepared in the liquid state is contained in the compartment 3, a certain quantity is delivered at each revolution by the cup 5 pivoted at the end of an arm 17 fixed on the axle 6; on reaching the top of its course the cup 5 empties itself into a funnel 18 which conducts the reagent by a pipe 19 into the compartment 2 where it mixes with the measured quantity of water.

In order that the rotary cup 5 may always deliver the same quantity of reagent it is oriented during its movement by a cam 20 mounted on the axle 6. This cam of triangular form turns in a frame of lever 21 keyed on a shaft 22; on this shaft is keyed a lever 23 the end of which is connected by a rod 24 to a small crank 25 keyed on the axle of the cup 5. The cam 20 is so shaped that the cup 5 dips into the reagent, the opening forward (Fig. 4) then redresses itself (Fig. 5) when it is at the lower part of its course and remains in a vertical position which it retains until it delivers its contents into the funnel 18.

The mixture of the reagent with the crude water in the compartment 2 is facilitated by the paddles 15, 16, which operate both as buffers and as mixers. The water mixed with the reagent flows out by the pipe 26, the height of which is such that the paddles have a sufficient moderative action.

The center of gravity of the empty receptacle, which can have different shapes, without the weight 27 is on the axis of rotation 6; the additional weight 27 which brings the receptacle to the vertical need consequently only be small.

When the receptacle is full the center of gravity is still on the axis of 6 so that the device is very sensitive since the volume of liquid does not intervene and the volume of water delivered at each revolution is absolutely constant.

The movement of the cup is such that it emerges always perpendicularly to the surface of the reagent. It consequently emerges from the reagent full so that the same quantity of reagent is delivered at each revolution.

The paddles not being regulatable cannot get out of order and hinder the working of the apparatus.

What we claim as our invention and desire to secure by Letters Patent of the United States is:—

1. In a water purifying apparatus the combination of a rotary measuring vessel for water normally held in stable equilibrium, means for feeding water into said vessel, means whereby the water on reaching a determined level destroys the equilibrium of the measuring vessel and causes it to discharge its contents, and means acting in conjunction with said vessel for automatically collecting a measured quantity of reagent and discharging same to commingle with the discharged contents of the aforesaid measuring vessel.

2. In a water purifying apparatus the combination of a rotary measuring vessel for water normally held in stable equilibrium, means for feeding water into said vessel at its axis of rotation, means comprising a laterally projecting chamber into which the water enters on reaching a given level in the vessel to destroy the equilibrium thereof and cause it to discharge its contents, and means acting in conjunction with said vessel for automatically collecting a measured quantity of reagent and discharging same to commingle with the discharged contents of the aforesaid measuring vessel.

3. In a water purifying apparatus the combination of a rotary measuring vessel for water normally held in stable equilibrium, means for feeding water into said vessel, means whereby water on reaching a determined level destroys the equilibrium of the measuring vessel and causes it to discharge its contents, means acting in conjunction with said vessel for automatically collecting a measured quantity of reagent and discharging same to commingle with the discharged contents of the aforesaid measuring vessel, and means for automatically and simultaneously restoring the measuring vessel and reagent collecting and discharging device to normal position after each discharge.

4. In a water purifying apparatus the combination of a rotary measuring vessel for water normally held in stable equilibrium, means for feeding water into said vessel, means whereby the water on reaching a determined level destroys the equilibrium of the measuring vessel and causes it to discharge its contents, a measuring cup for reagent mounted for rotation about the axis of the water measuring vessel and about an axis remote therefrom and means for causing said cup to rotate about said last mentioned axis to collect a quantity of reagent and subsequently discharge same to commingle with the discharge of the aforesaid measuring vessel.

5. In a water purifying apparatus the combination of a rotary measuring vessel for water normally held in stable equilibrium, means for feeding water into said vessel at its axis of rotation, means comprising a laterally projecting chamber into which the water enters on reaching a given level in the vessel to destroy the equilibrium thereof and cause it to discharge its contents, a measuring cup for reagent mounted for rotation about the axis of the water measuring vessel and about an axis remote therefrom and means for causing said cup to rotate about said last mentioned axis to collect a quantity of reagent and subsequently discharge same to commingle with the discharge of the aforesaid measuring vessel.

6. In a water purifying apparatus the combination with a tank divided into a plurality of compartments, of a rotary measuring vessel for water normally held in stable equilibrium, means for feeding water into said vessel, means comprising a chamber extending laterally from said vessel into which the water enters on reaching a given level, to destroy the equilibrium of said vessel and discharge its contents into one compartment of said tank, a measuring cup for liquid reagent mounted for rotation about the axis of the water measuring vessel and about an axis remote therefrom, means for causing said cup to rotate about said last mentioned axis to collect a quantity of reagent from another of said compartments and subsequently discharge same into said first mentioned compartment and means carried by said rotary vessel to mix the liquid contents of said compartment.

7. In a water purifying apparatus the combination with a tank divided into a plurality of compartments of a rotary measuring vessel for water normally held in stable equilibrium, means comprising a funnel for feeding water into said vessel at its axis of rotation, said funnel taking part in the rotation of the vessel, means comprising a chamber extending laterally from said vessel into which the water enters on reaching a given level to destroy the equilibrium of said vessel and discharge its contents into one compartment of said tank, a measuring cup for liquid reagent mounted for rotation about the axis of the water measuring vessel and about an axis remote therefrom, means for causing said cup to rotate about said last mentioned axis to collect a quantity of reagent from another of said compartments and subsequently discharge same into said first mentioned compartment and means carried by said rotary vessel to mix the liquid contents of said compartment.

In witness whereof we have signed this specification in the presence of two witnesses.

ALBERT WINCKLER.
CHARLES WINCKLER.

Witnesses:
JNO. N. BROWN,
GASTON JEAUNIAUX.

---

Copies of this patent may be obtained for five cents each, by addressing the "Commissioner of Patents, Washington, D. C."